US012738435B2

(12) United States Patent
Kuo

(10) Patent No.: US 12,738,435 B2
(45) Date of Patent: Sep. 15, 2026

(54) ELECTROMAGNETIC RELAY

(71) Applicant: EXCEL CELL ELECTRONIC CO., LTD., Taichung (TW)

(72) Inventor: Ming-Chang Kuo, Taichung City (TW)

(73) Assignee: Excel Cell Electronic Co., Ltd., Taichung (TW)

( * ) Notice: Subject to any disclaimer, the term of this patent is extended or adjusted under 35 U.S.C. 154(b) by 227 days.

(21) Appl. No.: 18/788,801

(22) Filed: Jul. 30, 2024

(65) Prior Publication Data

US 2025/0069833 A1 Feb. 27, 2025

(30) Foreign Application Priority Data

Aug. 21, 2023 (TW) ................................ 112131372

(51) Int. Cl.

*H01H 50/18* (2006.01)
*H01H 50/14* (2006.01)
*H01H 50/54* (2006.01)

(52) U.S. Cl.

CPC ............ *H01H 50/18* (2013.01); *H01H 50/14* (2013.01); *H01H 50/54* (2013.01)

(58) Field of Classification Search

CPC ........ H01H 50/18; H01H 50/14; H01H 50/54; H01H 50/24; H01H 50/26; H01H 50/642; H01H 50/16; H01H 50/60

See application file for complete search history.

(56) References Cited

U.S. PATENT DOCUMENTS

| | | | | |
|---|---|---|---|---|
| 4,761,627 A * | 8/1988 | Bell | ..................... | H01H 50/641 335/83 |
| 2017/0162353 A1* | 6/2017 | Kubono | ................. | H01H 50/38 |

FOREIGN PATENT DOCUMENTS

| | | | | |
|---|---|---|---|---|
| CN | 116580999 A * | 8/2023 | ............. | H01H 50/54 |
| EP | 1471557 A2 * | 10/2004 | ............ | B42F 15/066 |
| JP | S18013089 U | 11/1943 | | |
| JP | S62222530 A | 9/1987 | | |
| JP | 2007213892 A | 8/2007 | | |
| JP | 2016031803 A | 3/2016 | | |
| TW | M611848 | 5/2021 | | |

* cited by examiner

*Primary Examiner* — Mohamad A Musleh
(74) *Attorney, Agent, or Firm* — Burris Law, PLLC

(57) ABSTRACT

An electromagnetic relay includes an electromagnetic unit, a magnetic unit, first and second contacts, and a movable conductive terminal. The magnetic unit has a magnetic member having a fulcrum portion, a magnetic driven subunit, an arcuate groove, and an arcuate protrusion. The magnetic driven subunit includes a pushing block for pushing the movable conductive terminal, and a magnetic component magnetically attractable by the electromagnetic unit. The arcuate groove and the arcuate protrusion are respectively and interchangeably formed in the fulcrum portion and the magnetic component, and are pivotably connected to each other such that the magnetic component is pivotable about the fulcrum portion relative to the magnetic member. The movable conductive terminal is driven by the electromagnetic unit to contact one of the first contact and the second contact.

6 Claims, 14 Drawing Sheets

ELECTROMAGNETIC RELAY

CROSS-REFERENCE TO RELATED APPLICATION

This application claims priority to Taiwanese Invention Patent Application No. 112131372, filed on Aug. 21, 2023, the entire disclosure of which is incorporated by reference herein.

FIELD

The disclosure relates to a relay, and more particularly to an electromagnetic relay.

BACKGROUND

Referring to FIGS. 1 and 2, a conventional electromagnetic relay 100 disclosed in Taiwanese Utility Model Patent No. M611848 includes a seat body 101, an electromagnet 102 disposed on the seat body 101, a magnetic plate 103 disposed on the electromagnet 102, a magnetic driven plate 104 pivotably connected to an upper end of the magnetic plate 103 and magnetically attractable by the electromagnet 102, a first contact 105 disposed on the seat body 101 and located above the electromagnet 102, a second contact 106 spaced apart from and disposed above the first contact 105, and a conductive pin 107 disposed on the magnetic driven plate 104 and co-movable with pivot movement of the magnetic driven plate 104. The conductive pin 107 has a conductive contact 108 disposed between the first contact 105 and the second contact 106.

As shown in FIG. 1, when the electromagnet 102 is energized, the magnetic driven plate 104 is magnetically attracted by the electromagnet 102 and drives the conductive contact 108 to move downwardly to contact the first contact 105. As shown in FIG. 2, when the electromagnet 102 is powered off, the magnetic driven plate 104 is not attracted by the electromagnet 102 and moves upwardly. At this time, a gap 109 is formed between the magnetic driven plate 104 and the magnetic plate 103, and the conductive contact 108 moves upwardly and contacts the second contact 106. In this way, circuits (not shown) that are connected to the first contact 105 and the second contact 106 are switched on and off.

Since the gap 109 formed between the magnetic driven plate 104 and the magnetic plate 103 increases magnetoresistance, the magnetic attraction force generated by the electromagnet 102 is first consumed by the magnetoresistance generated by the gap 109 and then drives the pivot movement of the magnetic driven plate 104 relative to the magnetic plate 103. In a case where the electromagnet 102 is not stably energized or a power supplied to the electromagnet 102 is insufficient, the magnetic force thus generated may result in unstable downward movement of the conductive contact 108, which adversely affects reliability and sensitivity of the conventional electromagnetic relay 100.

SUMMARY

Therefore, an object of the disclosure is to provide an electromagnetic relay that can alleviate at least one of the drawbacks of the prior art.

According to the disclosure, an electromagnetic relay includes a base unit, an electromagnetic unit, a magnetic unit, a first conductive terminal, a second conductive terminal, and a movable conductive terminal. The electromagnetic unit is disposed on the base unit and is operable for generating an electromagnetic force when being energized. The magnetic unit is mounted to the electromagnetic unit and has a magnetic member, a magnetic driven subunit, an arcuate groove, and an arcuate protrusion. The magnetic member is connected fixedly to the electromagnetic unit and has a fulcrum portion. The magnetic driven subunit includes a pushing block and a magnetic component. The magnetic component has a magnetic driven portion that is supported on the fulcrum portion and that is magnetically attractable by the electromagnetic unit, and a levered portion that extends substantially transversely from one side of the magnetic driven portion and that is connected to the pushing block. The arcuate groove is formed in one of the fulcrum portion and the magnetic driven portion. The arcuate protrusion is formed at another one of the fulcrum portion and the magnetic driven portion, is pivotably connected to the arcuate groove such that the magnetic component is pivotable about the fulcrum portion relative to the magnetic member. The first conductive terminal is disposed on the base unit and includes a first contact. The second conductive terminal is disposed on the base unit and includes a second contact that is opposite to and spaced apart from the first contact. The movable conductive terminal includes a movable conductive connector that is disposed on the base unit, that is disposed between the first contact and the second contact, and that is pushed by the pushing block of the magnetic driven subunit when the electromagnetic unit is energized, and a movable contact that is disposed on the movable conductive connector. When the electromagnetic unit is energized, the magnetic component is magnetically attracted and driven by the electromagnetic force of the electromagnetic unit to move, such that the levered portion of the magnetic component drives the pushing block to push the movable conductive connector and that the movable contact contacts one of the first contact and the second contact. When the electromagnetic unit is powered off, the magnetic component is not magnetically attracted by the electromagnetic unit, such that the movable contact contacts another one of the first contact and the second contact.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
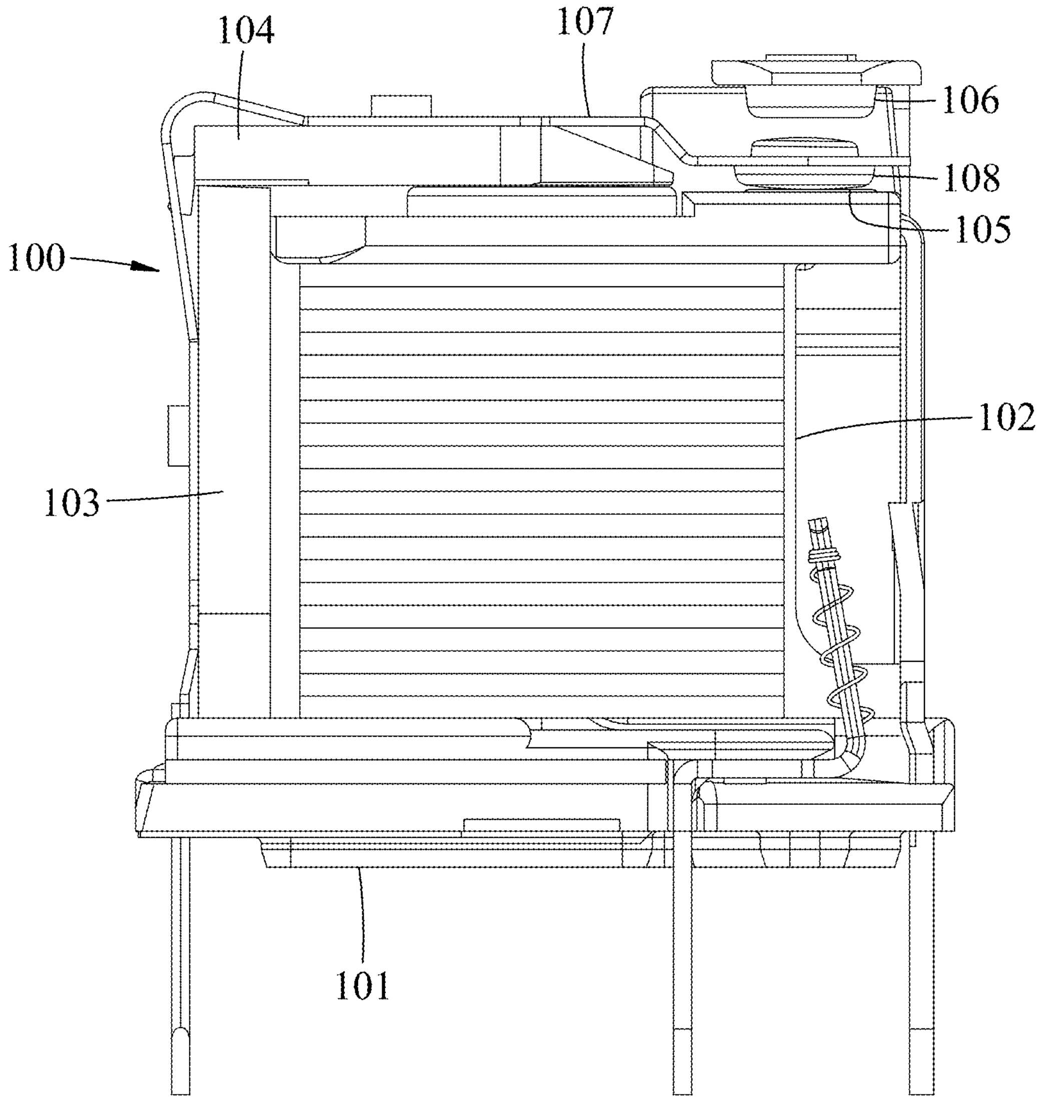
FIG. 1 PRIOR ART
FIG. 1 is a schematic side view illustrating a conventional electromagnetic relay that is disclosed in Taiwanese Utility Model Patent No. M611848, and an electromagnet thereof that is energized.
Figure 2:
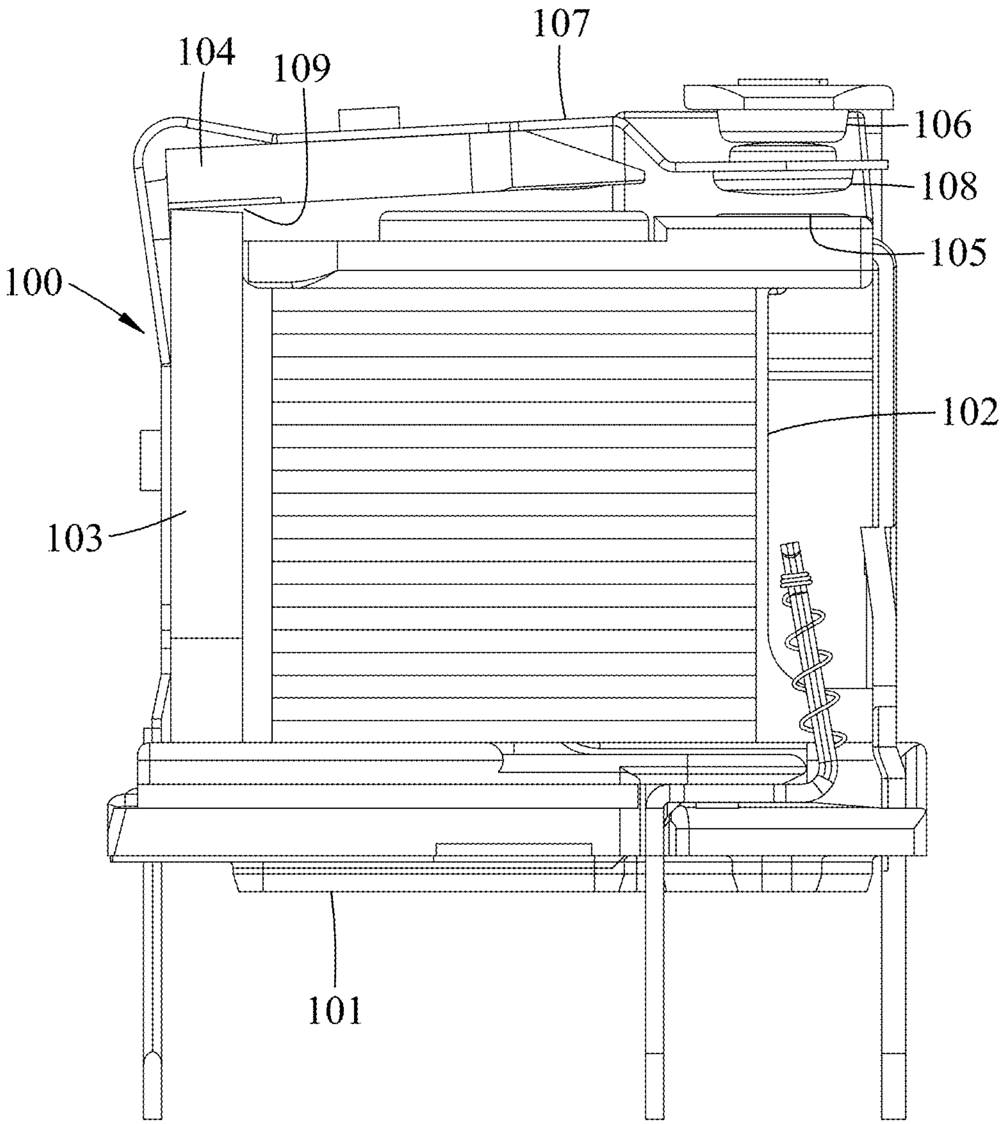
FIG. 2 PRIOR ART
FIG. 2 is a schematic side view illustrating the conventional electromagnetic relay being powered off.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
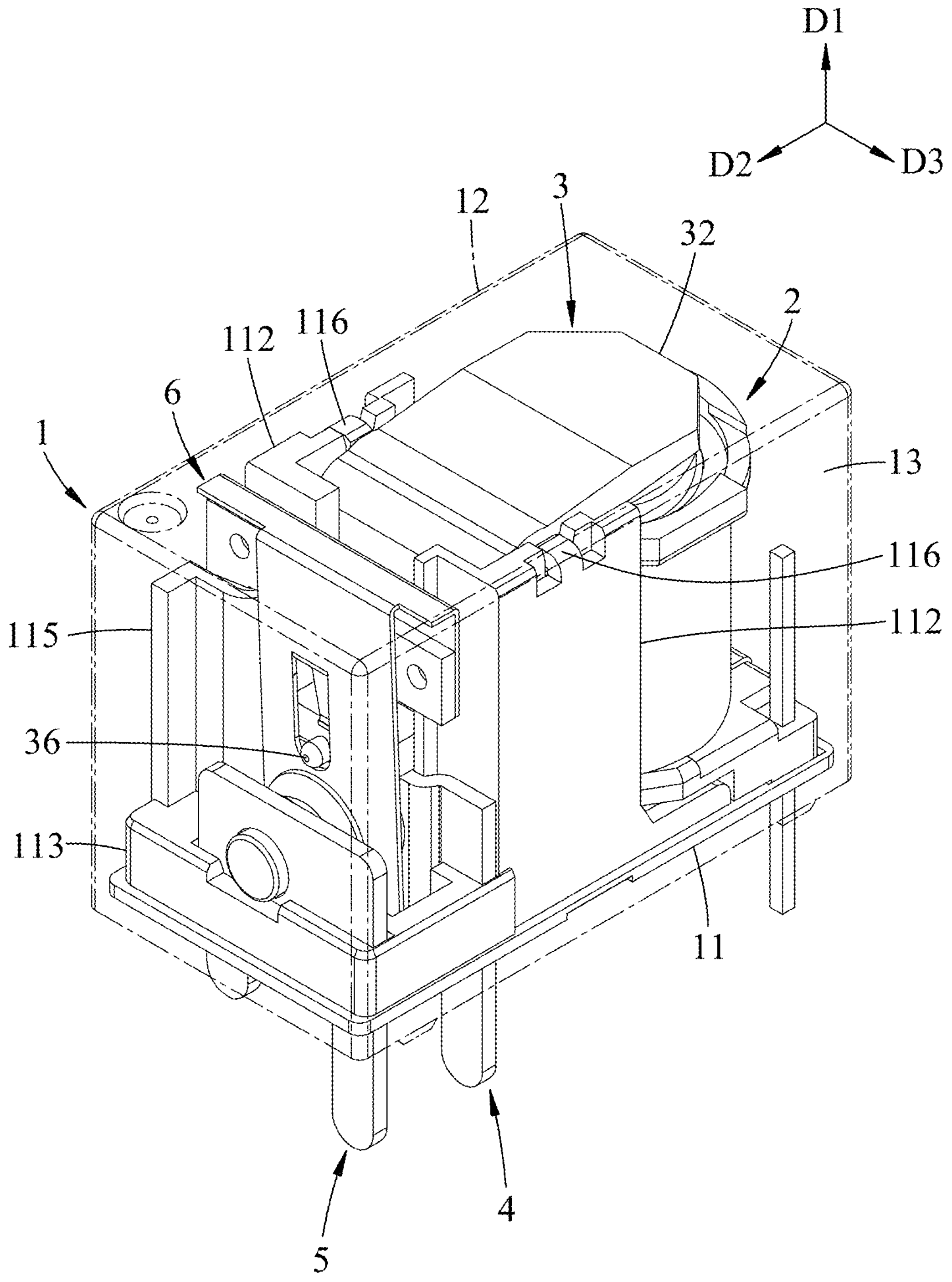
FIG. 3 is a schematic perspective view, illustrating an embodiment of an electromagnetic relay according to the present disclosure.
Figure 4:
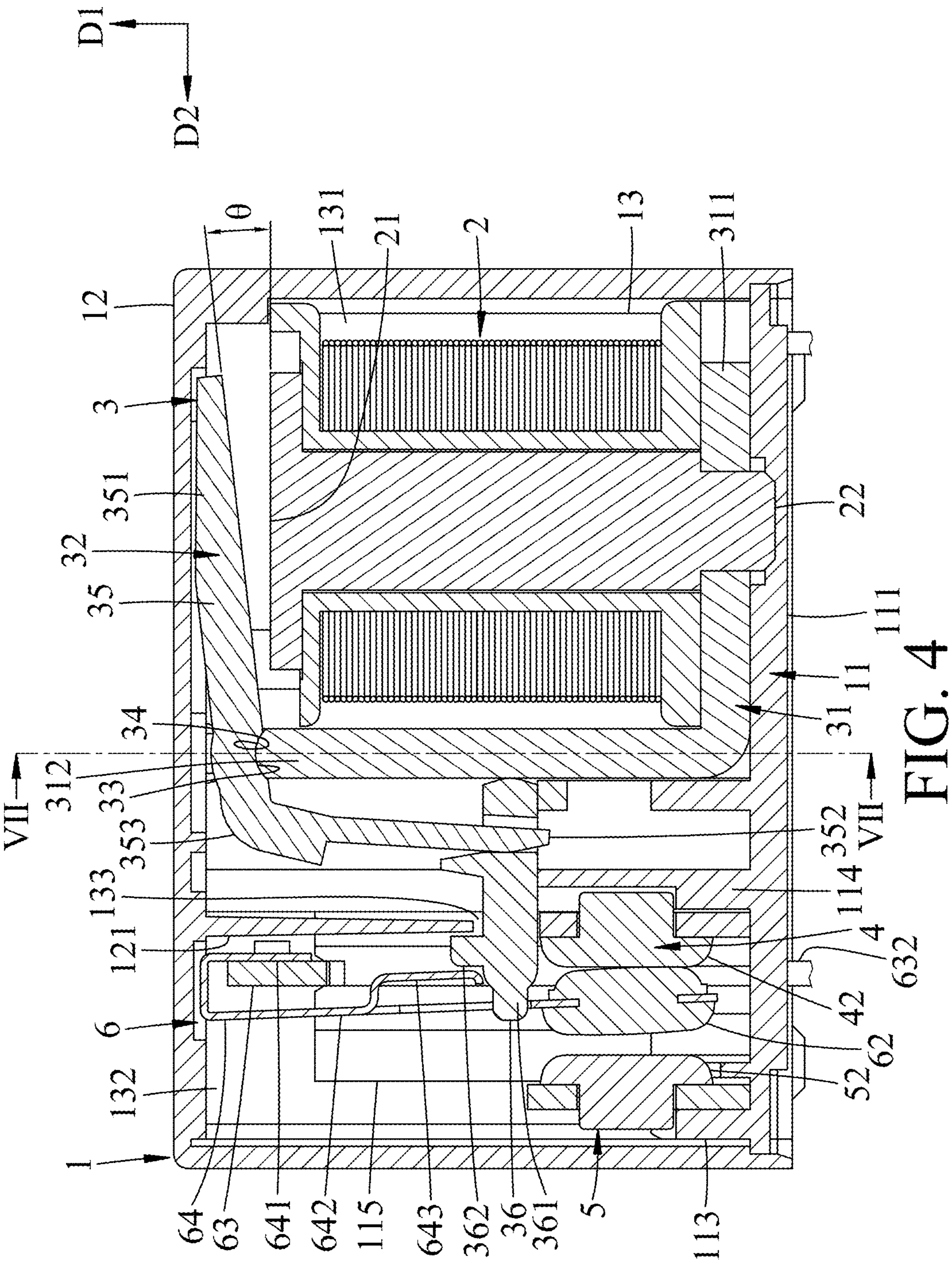
FIG. 4 is a fragmentary sectional view, illustrating a movable contact of a movable conductive terminal of the embodiment contacting a first contact of a first conductive terminal of the embodiment.

Referring to FIGS. 3 and 4, an embodiment of an electromagnetic relay according to the present disclosure includes a base unit 1, an electromagnetic unit 2, a magnetic unit 3, a first conductive terminal 4, a second conductive terminal 5, and a movable conductive terminal 6.

The base unit 1 includes a base seat 11, and a housing 12 covering the base seat 11.

Figure 5:
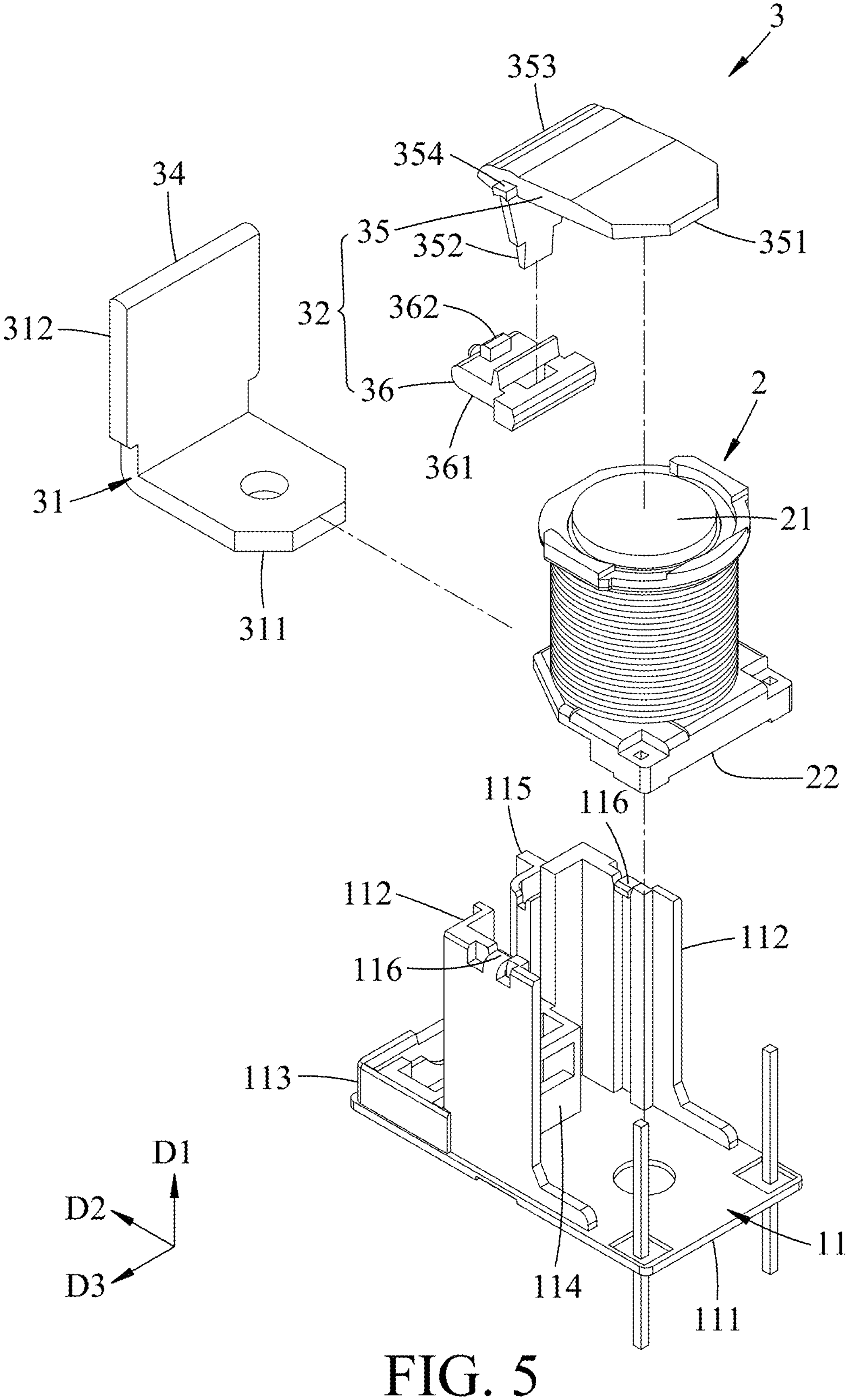
FIG. 5 is a partly exploded perspective view, illustrating a relationship among a base seat of a base unit, an electromagnetic unit, and a magnetic unit of the embodiment.
Figure 6:
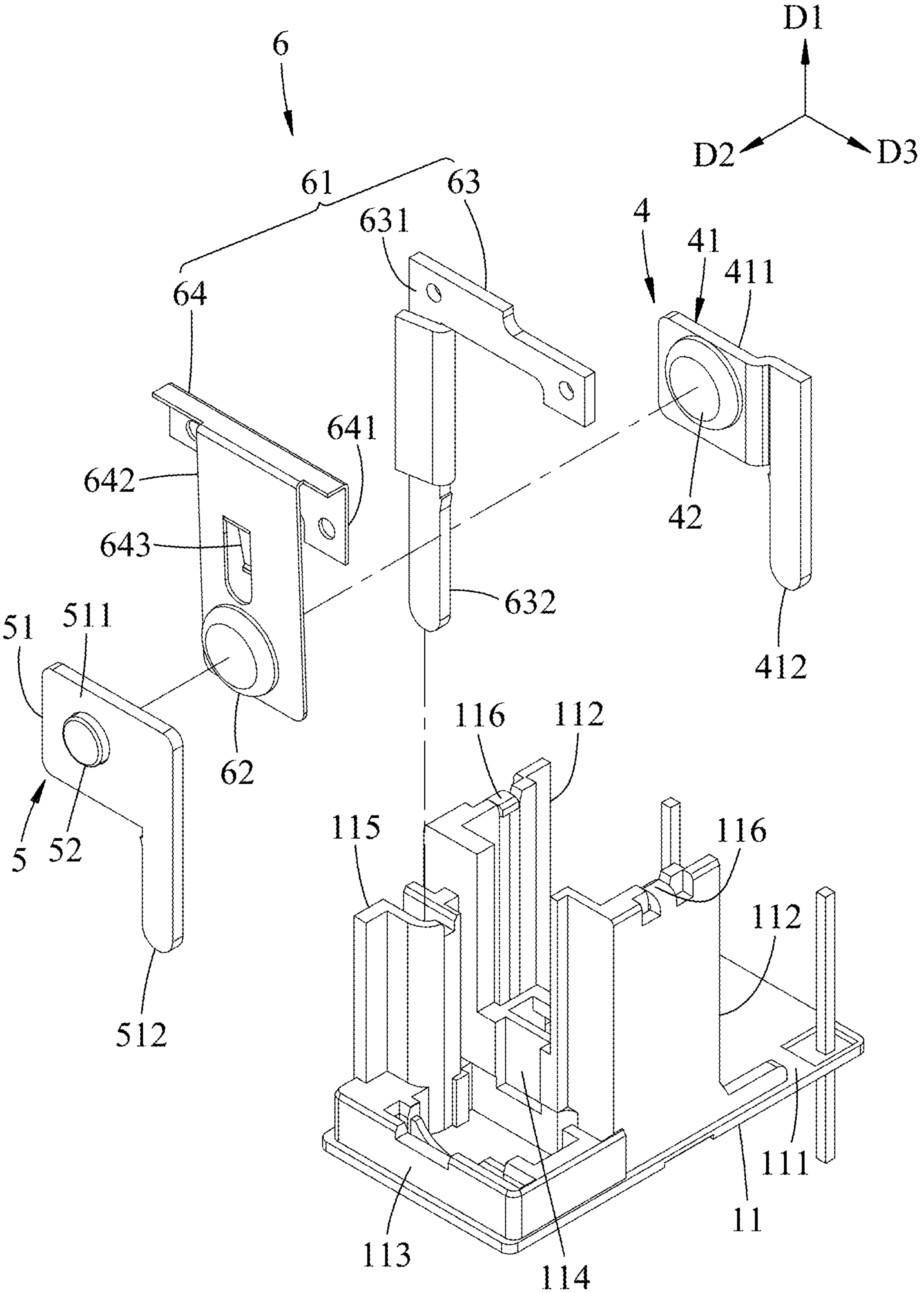
FIG. 6 is a partly exploded perspective view, illustrating a relationship among the base seat, the first conductive terminal, a second conductive terminal, and the movable conductive terminal of the embodiment.

Further referring to FIGS. 5 and 6, the base seat 11 has a base wall 111, two side walls 112, a conductive terminal seat 113, a pushing block seat 114, a positioning seat 115, and two engaging portions 116. The side walls 112 are generally L-shaped, extend upwardly from the base wall 111 in a first direction (D1), and are spaced apart from each other in a third direction (D3) transverse to the first direction (D1). The base wall 111 extends in a second direction (D2) transverse to the first direction (D1) and the third direction (D3). The conductive terminal seat 113 is substantially U-shaped and has two end portions respectively connected to the side walls 112. The pushing block seat 114 is disposed between the side walls 112 and is adjacent to the conductive terminal seat 113 in the second direction (D2). The positioning seat 115 extends upwardly from one of the end portions of the conductive terminal seat 113 in the first direction (D1) and is connected to one of the side walls 112. The engaging portions 116 are spaced apart from each other in the third direction (D3) and are respectively disposed on the side walls 112.

In this embodiment, the first direction (D1), the second direction (D2) and the third direction (D3) are substantially perpendicular to one another. In addition, the first direction (D1) is an up-down direction, the second direction (D2) is a left-right direction, and the third direction (D3) is a front-rear direction, and the present disclosure is not limited hereto.

As shown in FIGS. 3 and 4, the housing 12 and the base seat 11 cooperatively define a receiving space 13. The housing 12 includes a partitioning plate 121 extending downwardly and disposed above the pushing block seat 114. The partitioning plate 121 divides the receiving space 13 into a first space 131 and a second space 132 that are arranged in the second direction (D2). The first space 131 is generally disposed between the side walls 112 in the third direction (D3). The second space 132 is disposed above the conductive terminal seat 113. The receiving space 13 further has an extension hole 133 formed between the partitioning plate 121 and the pushing block seat 114 and in fluid communication with the first space 131 and the second space 132.

The electromagnetic unit 2 is disposed on the base unit 1 and is operable for generating an electromagnetic force. The electromagnetic unit 2 is an electromagnet, and has a first end 21 and a second end 22 that are oppositely disposed in the first direction (D1). The second end 22 is connected to the base wall 111.

Figure 7:
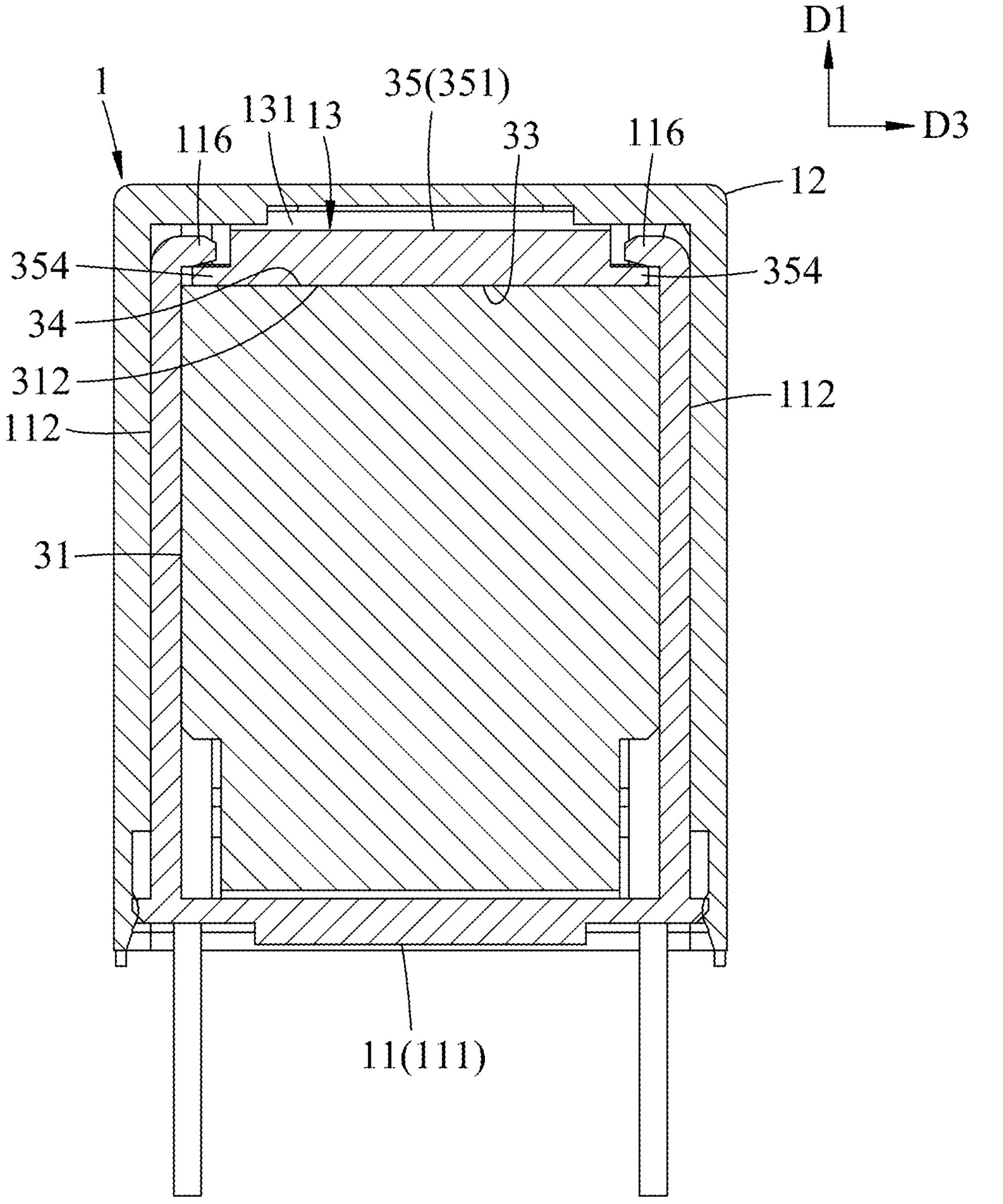
FIG. 7 is a sectional view taken along line VII-VII in FIG. 4.

Referring to FIGS. 4, 5 and 7, the magnetic unit 3 is mounted to the electromagnetic unit 2 and has a magnetic member 31, a magnetic driven subunit 32, an arcuate groove 33, and an arcuate protrusion 34.

The magnetic member 31 is substantially L-shaped, and has a fixed portion 311 fixedly connected to the second end 22 of the electromagnetic unit 2 and the base wall 111, and a fulcrum portion 312 extending upwardly from one side of the fixed portion 311.

The magnetic driven subunit 32 is disposed on the magnetic member 31 and includes a pushing block 36 and a magnetic component 35.

The pushing block 36 is made of an electrical insulating material and is mounted to the pushing block seat 114. The pushing block 36 abuts against the pushing block seat 114, extends through the extension hole 133, and is movable leftward and rightward. The pushing block 36 has a push block body 361 extending in the second direction (D2) and extending into the second space 132 through the extension hole 133, and a pushing protrusion 362 protruding upwardly from the push block body 361 in the first direction (D1) and located in the second space 132. The pushing protrusion 362 faces the partitioning plate 121.

The magnetic component 35 is substantially inverted L-shaped and is pivotably disposed on the magnetic member 31. The magnetic component 35 is connected to the pushing block 36 for driving the pushing block 36 to move. The magnetic component 35 has a magnetic driven portion 351, a levered portion 352, a bent portion 353, and two positioning portions 354 (only one is visible in FIG. 5). The magnetic driven portion 351 pivotably abuts against the fulcrum portion 312 of the magnetic member 31, and extends in the second direction (D2). The magnetic driven portion 351 is magnetically attracted to the first end 21 of the electromagnetic unit 2 when the electromagnetic unit 2 is energized, and the magnetic driven portion 351 is pivotable about the fulcrum portion 312. The levered portion 352 extends substantially transversely and downwardly from a left side of the magnetic driven portion 351 and extends through the pushing block 36 so as to be connected to the pushing block 36. The bent portion 353 is connected between the magnetic driven portion 351 and the levered portion 352, and is spaced apart from the magnetic member 31 in the second direction (D2). The positioning portions 354 extend away from each other and respectively extend from two sides of the magnetic driven portion 351 opposite in the third direction (D3), and are adjacent to the fulcrum portion 312, and each of the positioning portions 354 is inserted between a respective one of the engaging portions 116 and the magnetic member 31. By virtue of the engaging portions 116 of the base seat 11 that are bent from the side walls 112, that extend toward each other, and that respectively press against and position the positioning portions 354, the magnetic component 35 may be prevented from detaching from the magnetic member 31 during pivot movement of the magnetic component 35.

The arcuate groove 33 is formed in one of the fulcrum portion 312 and the magnetic driven portion 351. In this embodiment, the arcuate groove 33 is formed in the magnetic driven portion 351 of the magnetic component 35 and opens toward the fulcrum portion 312.

The arcuate protrusion 34 is formed at another one of the fulcrum portion 312 and the magnetic driven portion 351. In this embodiment, the arcuate protrusion 34 is formed at the fulcrum portion 312 of the magnetic member 31 and is pivotably connected to the arcuate groove 33 such that the magnetic component 35 is pivotable about the arcuate protrusion 34 relative to the magnetic member 31. In addition, the arcuate groove 33 is complementary in shape with the arcuate protrusion 34 in this embodiment. The magnetic driven portion 351 of the magnetic component 35 has a bottom surface cooperates with a horizontal surface normal to the first direction (D1) to define an included angle (θ) (see FIG. 4) therebetween.

It should be noted that in other embodiments, the arcuate groove 33 and the arcuate protrusion 34 are interchangeable and are respectively formed at the fulcrum portion 312 and the magnetic driven portion 351, and the configurations of the arcuate groove 33 and the arcuate protrusion 34 may be modified as required as long as the arcuate groove 33 is complementary in shape with the arcuate protrusion 34.

Referring to FIGS. 4 and 6, the first conductive terminal 4 and the second conductive terminal 5 are spaced apart from each other in the second direction (D2) and are disposed on the conductive terminal seat 113 of the base seat 11 of the base unit 1. The first conductive terminal 4 is disposed closer to the electromagnetic unit 2 than the second conductive terminal 5 and includes a first conductive member 41 and a first contact 42. The first conductive member 41 is a metal sheet formed as one piece, and includes a first main body 411 disposed in the second space 132 and adjacent to the pushing block seat 114, and a first pin 412 extending downwardly from the first main body 411 and outwardly through the base wall 111. The first contact 42 is fixedly connected to the first main body 411. The first conductive terminal 4 is connected to an external circuit (not shown) by the first pin 412.

The second conductive terminal 5 includes a second conductive member 51 and a second contact 52. The second conductive member 51 is a metal sheet formed as one piece, and includes a second main body 511 disposed in the second space 132 and spaced apart from the first main body 411 in the second direction (D2), and a second pin 512 extending downwardly from the second main body 511 and outwardly through the base wall 111. The second contact 52 is fixedly connected to the second main body 511 and is opposite to and spaced apart from the first contact 42 in the second direction (D2). The second conductive terminal 5 is connected to another external circuit (not shown) by the second pin 512.

The movable conductive terminal 6 is disposed in the second space 132 of the base unit 1, and includes a movable conductive connector 61 disposed on the base unit 1 and a movable contact 62 disposed on the movable conductive connector 61.

The movable conductive connector 61 includes a conductive plate 63 disposed on the positioning seat 115, and a swing sheet 64 movably connected to the conductive plate 63, and pushed by the pushing block 36 of the magnetic driven subunit 32 when the electromagnetic unit 2 is energized.

The conductive plate 63 is substantially inverted L-shaped and is a metal sheet. The conductive plate 63 has a fixed portion 631 positioned on a top end of the positioning seat 115, and a movable pin 632 extending downwardly from the fixed portion 631 and outwardly through the base wall 111. The movable conductive terminal 6 is connected to an external circuit through the movable pin 632.

The swing sheet 64 is a metal sheet formed as one piece. The swing sheet 64 has a connecting portion 641, a swinging portion 642, and a resilient tab portion 643. The connecting portion 641 is movably connected to the fixed portion 631. The swinging portion 642 extends in the first direction (D1), is disposed between the first contact 42 and the second contact 52 in the second direction (D2), and is provided for the movable contact 62 to be disposed thereon. The resilient tab portion 643 is disposed between the fixed portion 631 and the movable contact 62 in the second direction (D2), extends from the swinging portion 642 inclinedly toward the magnetic driven subunit 32 and the movable contact 62. When being pushed by the pushing protrusion 362 of the pushing block 36, the resilient tab portion 643 is configured to store a restoring force. In this embodiment, the resilient tab portion 643 is disposed between the connecting portion 641 and the movable contact 62. In this embodiment, the conductive plate 63 and the swing sheet 64 are detachably connected by fastening means such as bolts (not shown) and the present disclosure is not limited in fastening means described herein. In addition, the conductive plate 63 and the swing sheet 64 may be integrally formed as one piece in other embodiments.

Figure 8:
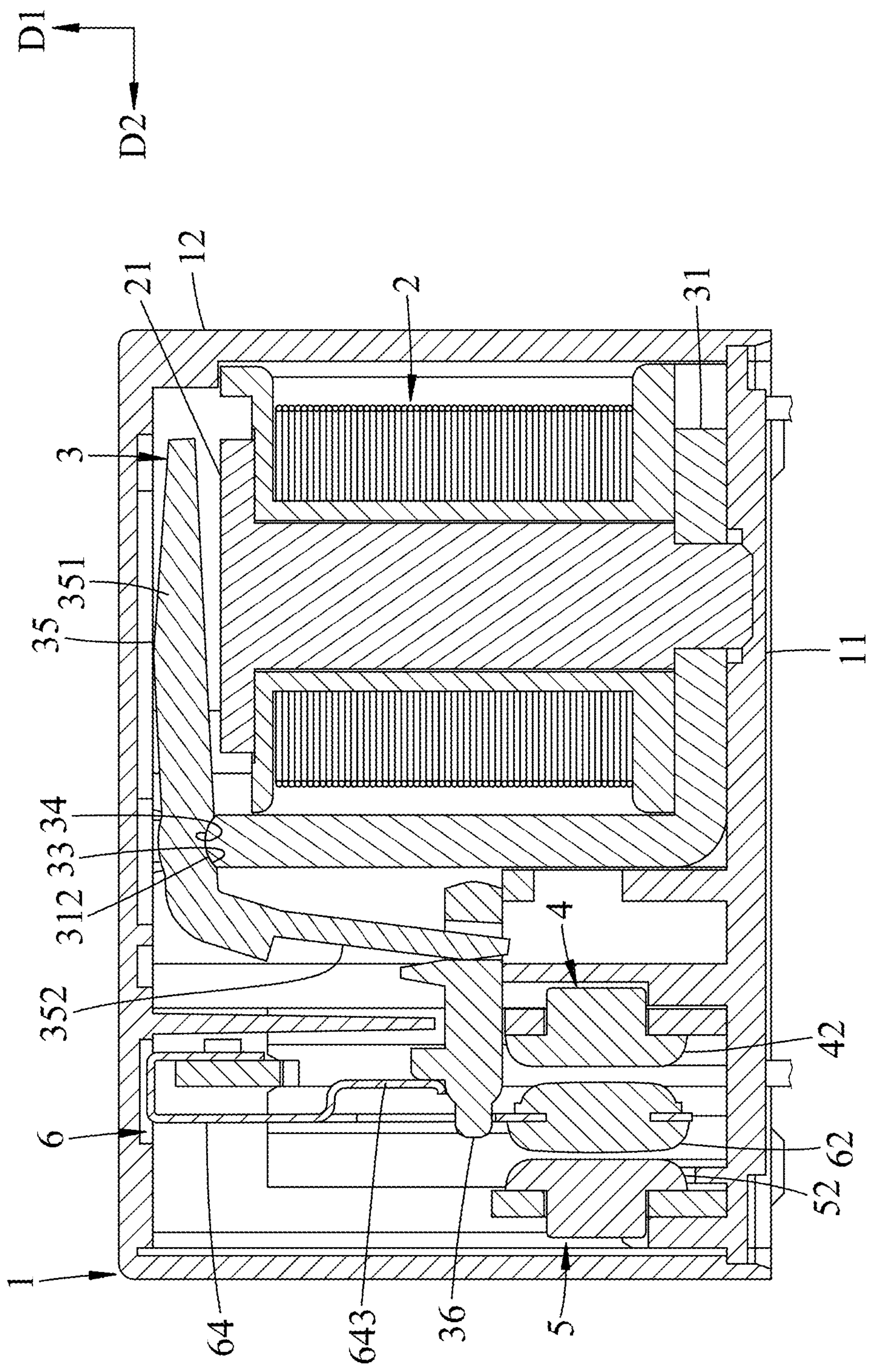
FIG. 8 is a sectional view similar to FIG. 4, but illustrating the movable contact being adjacent to and spaced apart from a second contact of the second conductive terminal.
Figure 9:
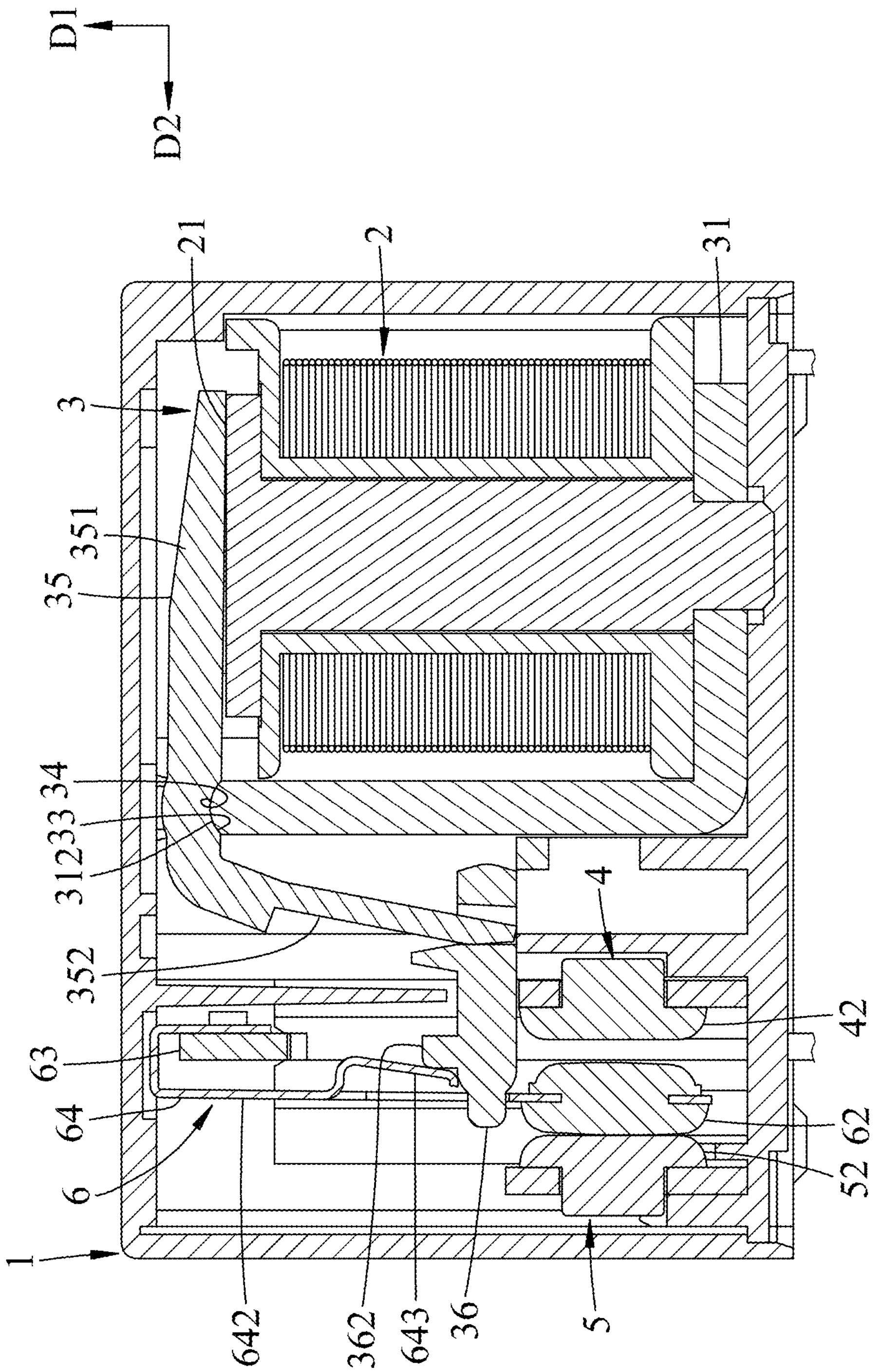
FIG. 9 is a sectional view similar to FIG. 8, but illustrating the movable contact contacting the second contact.

Referring to FIGS. 8 and 9, when the electromagnetic unit 2 is energized, the magnetic driven portion 351 of the magnetic component 35 is attracted and driven by the electromagnetic force generated at the first end 21 of the electromagnetic unit 2 to move and pivot downwardly relative to the arcuate protrusion 34, such that the levered portion 352 of the magnetic component 35 drives the pushing protrusion 362 of the pushing block 36 to push the resilient tab portion 643 of the movable conductive connector 61 to the left in the drawings, and that the swinging portion 642 swings toward the second contact 52 until the movable contact 62 contacts the second contact 52. During this process, as shown in FIG. 8, when the movable contact 62 is moving from the first contact 42 to the second contact 52 and is spaced apart from the second contact 52, the resilient tab portion 643 is continuously pushed by the pushing protrusion 362 of the pushing block 36 to move to the left until the movable contact 62 contacts the second contact 52 (see FIG. 9) while the swinging portion 642 and the resilient tab portion 643 of the swing sheet 64 of the movable conductive connector 61 are deformed to store a restoring force. When the electromagnetic unit 2 is powered off, as shown in FIG. 4, the magnetic driven portion 351 of the magnetic driven subunit 32 is not magnetically attracted by the electromagnetic unit 2, and the restoring force stored in the swing sheet 64 is released for biasing the movable contact 62 to contact the first contact 42, such that the magnetic driven portion 351 of the magnetic component 35 is pivoted upwardly relative to the arcuate protrusion 34. In this way, a function of switching the external circuits (not shown) that are respectively connected to the first contact 42 and the second contact 52 on and off may be achieved.

When a potential corrosion occurs between the movable contact 62 and the second contact 52 after a period of use, a distance between the movable contact 62 and the second contact 52 increases in the second direction (D2); by virtue of the resilient tab portion 643 that is pushed by the pushing block 36 to drive the swinging portion 642 to swing in a relatively large range, a relatively reliable electrical connection between the movable contact 62 and the second contact 52 may be provided.

Figure 10:
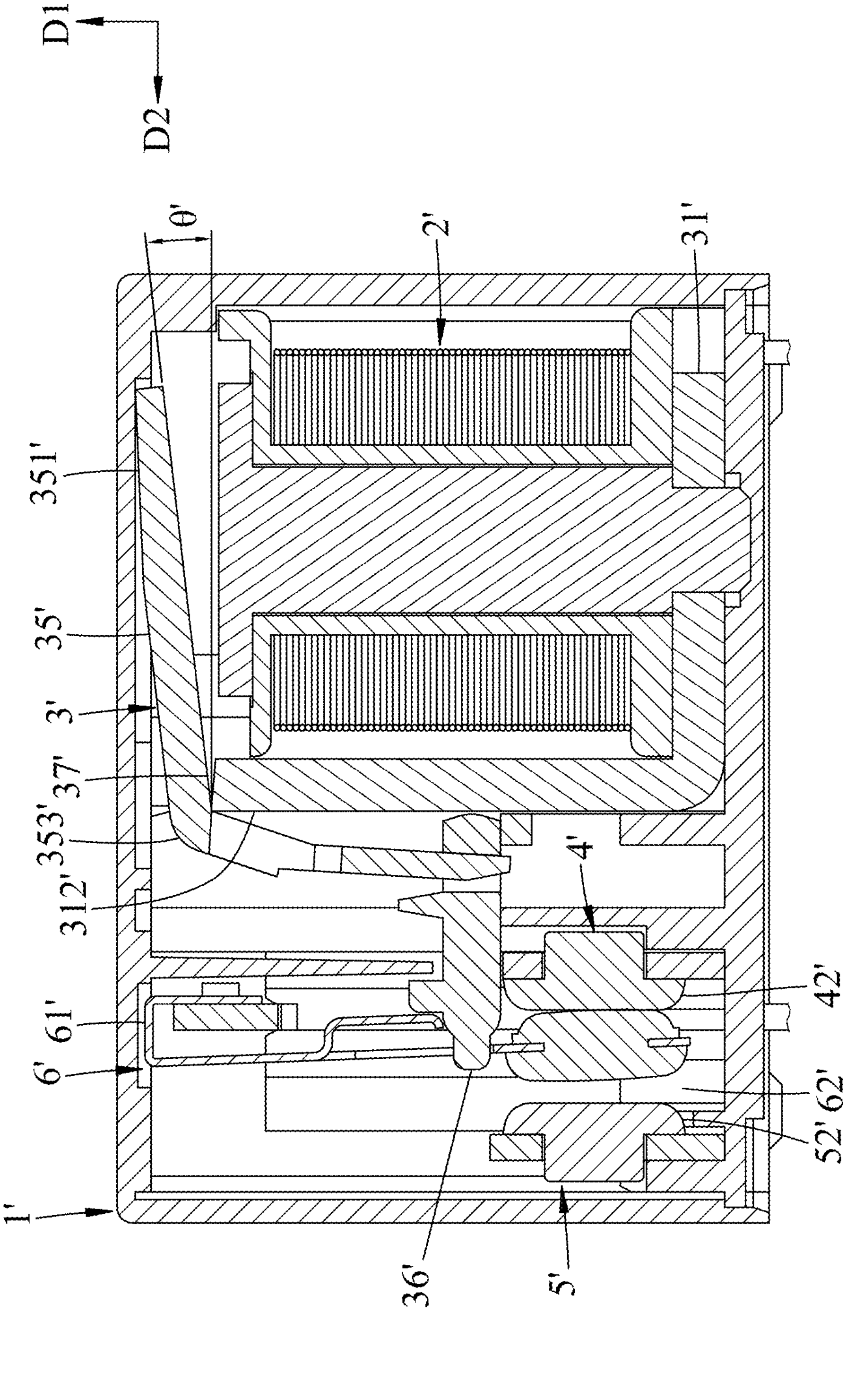
FIG. 10 is a sectional view illustrating a comparative example.
Figure 11:
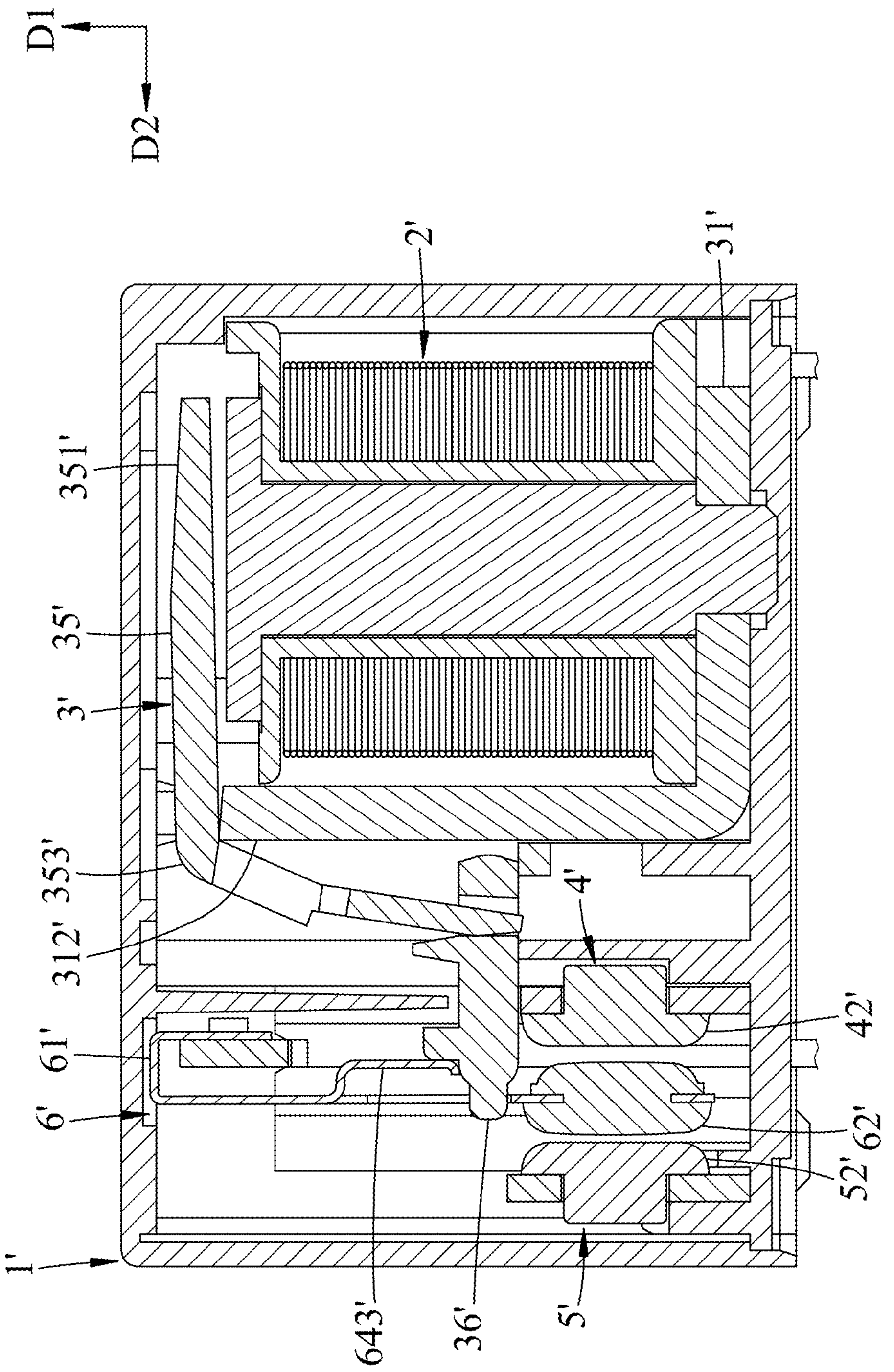
FIGS. 11 and 12 are sectional views of the comparative example, illustrating movement of a movable conductive terminal that is pushed by a magnetic driven subunit of a magnetic unit to move from a first conductive terminal to contact a second conductive terminal.
Figure 12:
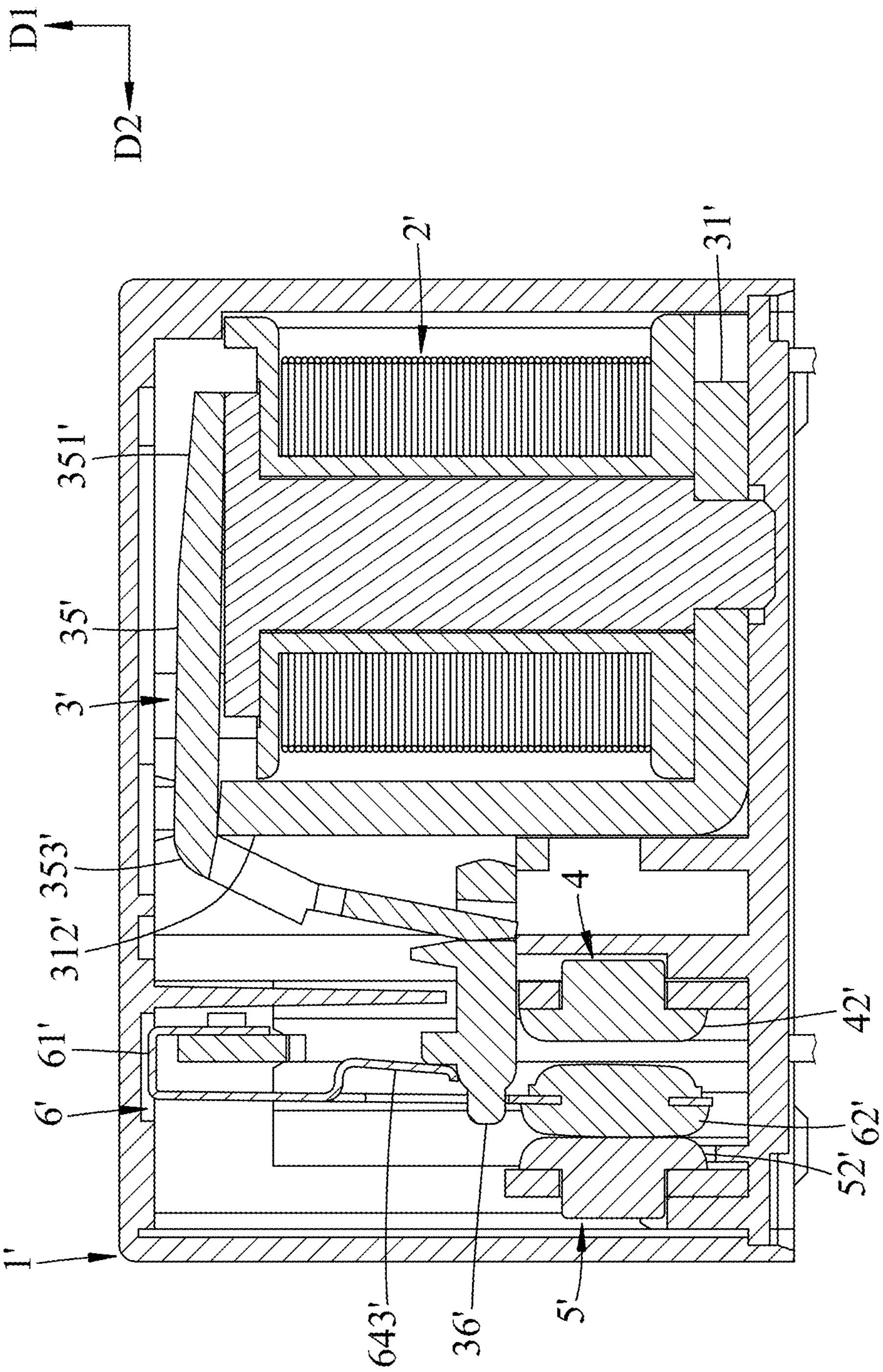

Referring to FIGS. 10 to 12, a comparative example of an electromagnetic relay is provided for comparison with the embodiment of present disclosure. The comparative example is similar to the embodiment and the differences therebetween reside in that the comparative example does not have the arcuate groove 33 and the arcuate protrusion 34 (see FIG. 4). In the comparative example, a bent portion 353' of a magnetic component 35' is in direct contact with a fulcrum portion 312' of a magnetic member 31', and is pivoted about the fulcrum portion 312' of the magnetic member 31'. A bottom surface of the magnetic component 35' cooperates with a horizontal surface normal to the first direction (D1) to define an included angle (θ') therebetween.

Figure 13:
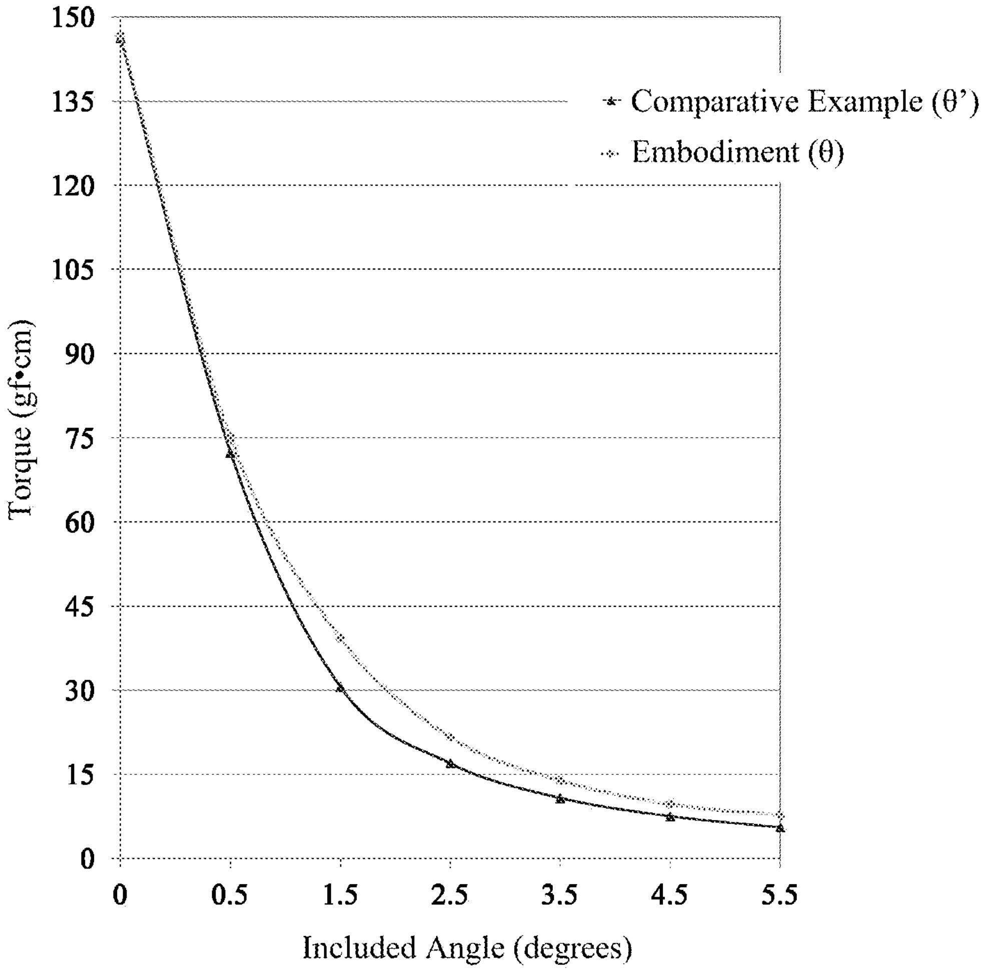
FIG. 13 is a graph illustrating relationships between torques of magnetic driven subunits and included angles relative to magnetic members of the embodiment and the comparative example.
Figure 14:
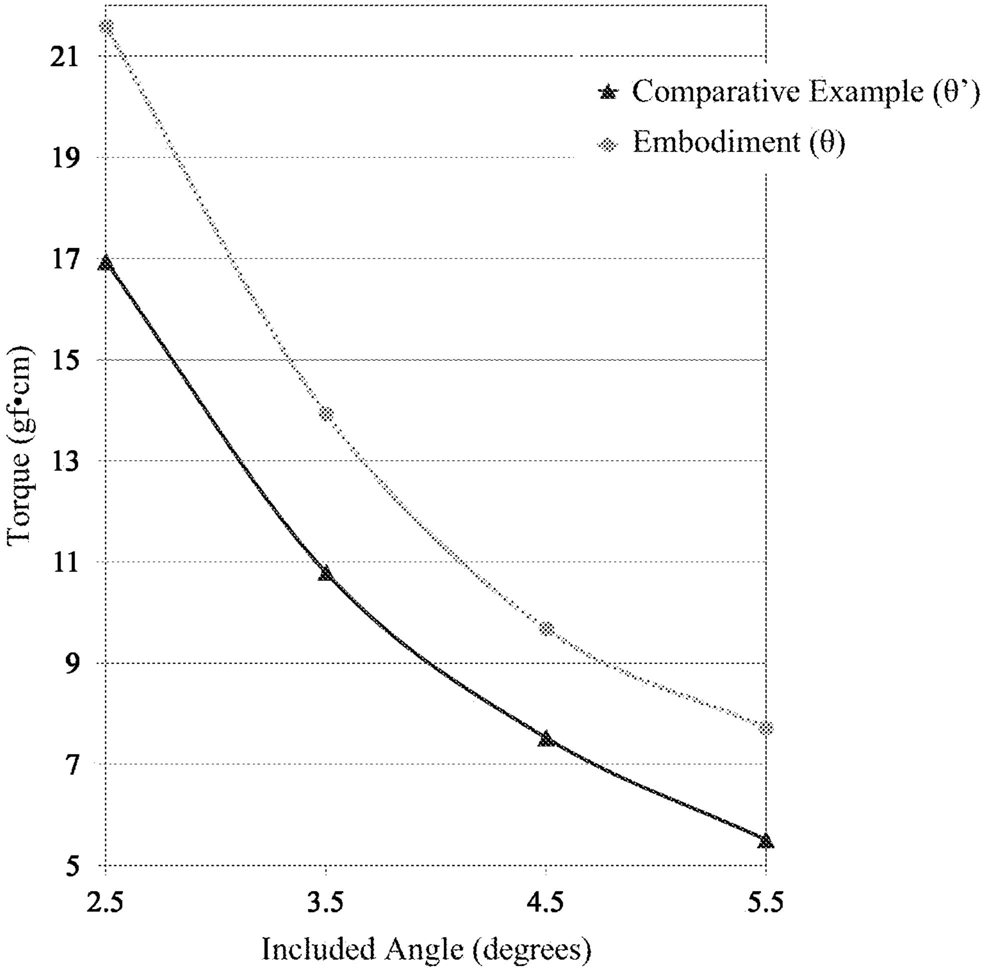
FIG. 14 is a partly enlarged view of FIG. 13.

Referring to FIGS. 13 and 14, a graph and a partly enlarged view thereof illustrating relationships between the included angles (θ, θ') and torques generated by the magnetic components 35, 35' relative to the magnetic members 31, 31' of the embodiment and the comparative example are shown. The relationships between the included angles (θ, θ') and the torques are summarized in Table 1. It should be noted that, a simulation software, e.g., Ansys workbench, is employed to obtain the torques at different measuring points.

In the comparative example, the measuring point (G') corresponds to FIG. 10, where a movable contact 62' contacts a first contact 42', and the included angle (θ') is 5.5 degrees. As shown in FIG. 10, an air gap 37' is formed between a bottom surface of a magnetic driven portion 351' of the magnetic component 35' and the fulcrum portion 312' of the magnetic member 31'. The measuring point (A') corresponds to FIG. 12, where the movable contact 62' contacts the second contact 52', and the included angle (θ') is 0 degrees.

It can be seen from FIG. 13 and FIG. 14 that, when the magnetic driven subunits 32, 32' are respectively disposed at the measuring point (G) and the measuring point (G'), the torque generated in the embodiment is greater than the torque generated in the comparative example. Such difference is owing to the fact that the electromagnetic force generated by an electromagnetic unit 2' of the comparative example is first consumed by magnetoresistance generated by the air gap 37' (see FIG. 10), and then attracts and drives the magnetic driven portion 351' to pivot relative to the fulcrum portion 312'. In the embodiment of the present disclosure, since the magnetic driven portion 351 of the magnetic component 35 pivots about the fulcrum portion 312 at the arcuate groove 33 that is pivotably connected to the arcuate protrusion 34, no air gap is formed between the magnetic component 35 and the fulcrum portion 312. Thus, as compared to the comparative example, magnetoresistance of the embodiment is lower and the torque generated by the magnetic component 35 is larger.

It may be inferred from the above description that, when the electromagnetic unit 2 is energized, the magnetoresistance of the embodiment is relatively low and thus the torque generated by the magnetic component 35 is relatively large. Thus, a force of the magnetic component 35 driving the pushing block 36 to push the resilient tab portion 643 of the movable conductive connector 61 is relatively large, thereby ensuring that the movable contact 62 is smoothly moved from a position of being in contact with the first contact 42 to another position of being in contact with the second contact 52. In the contrary, since the magnetoresistance of the comparative example is relatively large and the torque generated by the magnetic component 35' is consumed by the magnetoresistance, a force of the magnetic component 35' driving the pushing block 36' to move may not be sufficient to push the pushing block 36' to contact the second contact 52. Thus, the reliability and sensitivity of the embodiment for switching circuits is better than that of the comparative example.

In addition, it can further be inferred that, as compared to the comparative example, a smaller electromagnetic force may be sufficient to drive the movable contact 62 to move to contact the second contact 52 in the embodiment. Thus, another electromagnetic unit that generates a weaker elec-

TABLE 1

| Embodiment | | | Comparative Example | | |
|---|---|---|---|---|---|
| Measuring Point | Include Angle (θ)(degrees) | Torque (gf · cm) | Measuring Point | Include Angle (θ')(degrees) | Torque (gf · cm) |
| A | 0 | 146.59 | A' | 0 | 146.22 |
| B | 0.5 | 74.99 | B' | 0.5 | 72.34 |
| C | 1.5 | 39.31 | C' | 1.5 | 30.57 |
| D | 2.5 | 21.59 | D' | 2.5 | 16.94 |
| E | 3.5 | 13.92 | E' | 3.5 | 10.79 |
| F | 4.5 | 9.68 | F' | 4.5 | 7.52 |
| G | 5.5 | 7.72 | G' | 5.5 | 5.51 |

It should be noted that measuring points (A) to (G) respectively represent different positions of the magnetic driven subunit 32 during the process of the magnetic driven portion 351 moving toward the electromagnetic unit 2 when the electromagnetic unit 2 is energized, and measuring points (A') to (G') also respectively represent different positions of a magnetic driven subunit 32' of the comparative example. In this embodiment, the measuring point (G) corresponds to FIG. 4, where the movable contact 62 contacts the first contact 42 and the included angle (θ) is 5.5 degrees. The measuring point (A) corresponds to FIG. 9, where the movable contact 62 contacts the second contact 52 and the included angle (θ) is 0 degrees.

tromagnetic force and that has a relatively small size may be utilized, thereby decreasing an overall size of the embodiment of the present disclosure.

In the present disclosure, by virtue of the arcuate groove 33 being formed in the magnetic driven portion 351 of the magnetic component 35 and the arcuate protrusion 34 being formed at the fulcrum portion 312 of the magnetic member 31 and being pivotably connected to the arcuate groove 33, no air gap is formed between the magnetic component 35 and the fulcrum portion 312 and magnetoresistance resulting from an air gap may not be generated. Thus, the reliability and sensitivity of switching the movable contact 62 to be in contact with one of the first contact 42 and the second contact 52 is increased.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electromagnetic relay comprising:

- a base unit;
- an electromagnetic unit disposed on said base unit and operable for generating an electromagnetic force when being energized;
- a magnetic unit mounted to said electromagnetic unit and having
  - a magnetic member that is connected fixedly to said electromagnetic unit and that has a fulcrum portion,
  - a magnetic driven subunit that includes a pushing block and a magnetic component having:
    - a magnetic driven portion that is supported on said fulcrum portion and that is magnetically attractable by said electromagnetic unit; and
    - a levered portion that extends substantially transversely from one side of said magnetic driven portion and that is connected to said pushing block,
  - an arcuate groove that is formed in one of said fulcrum portion and said magnetic driven portion, and
  - an arcuate protrusion that is formed at another one of said fulcrum portion and said magnetic driven portion, that is pivotably connected to said arcuate groove such that said magnetic component is pivotable about said fulcrum portion relative to said magnetic member;
- a first conductive terminal disposed on said base unit and including a first contact;
- a second conductive terminal disposed on said base unit and including a second contact that is opposite to and spaced apart from said first contact; and
- a movable conductive terminal including
  - a movable conductive connector that is disposed on said base unit, that is disposed between said first contact and said second contact, and that is pushed by said pushing block of said magnetic driven subunit when said electromagnetic unit is energized, and
  - a movable contact that is disposed on said movable conductive connector,
- wherein, when said electromagnetic unit is energized, said magnetic component is magnetically attracted and driven by the electromagnetic force of said electromagnetic unit to move, such that said levered portion of said magnetic component drives said pushing block to push said movable conductive connector and that said movable contact contacts one of said first contact and said second contact, and when said electromagnetic unit is powered off, said magnetic component is not magnetically attracted by said electromagnetic unit, such that said movable contact contacts another one of said first contact and said second contact.

2. The electromagnetic relay as claimed in claim 1, wherein:

- said fulcrum portion of said magnetic member extends in a first direction;
- said magnetic driven portion of said magnetic component extends in a second direction transverse to the first direction;
- said levered portion extends transversely from said one side of said magnetic driven portion; and
- said magnetic component further has a bent portion connected between said magnetic driven portion and said levered portion, and spaced apart from said magnetic member in the second direction.

3. The electromagnetic relay as claimed in claim 1, wherein:

- said fulcrum portion of said magnetic member extends in a first direction;
- said magnetic driven portion of said magnetic component extends in a second direction transverse to the first direction;
- said levered portion extends transversely from said one side of said magnetic driven portion;
- said magnetic component further has two positioning portions respectively provided on two sides of said magnetic driven portion that are opposite in a third direction transverse to the first direction and the second direction; and
- said base unit has two engaging portions spaced apart from each other in the third direction and respectively positioning said positioning portions.

4. The electromagnetic relay as claimed in claim 3, wherein:

- said positioning portions of said magnetic component extend away from each other and extend respectively from two sides of said magnetic driven portion that are opposite in the third direction; and said engaging portions of said base unit extend toward each other along the third direction and respectively press against said positioning portions.

5. The electromagnetic relay as claimed in claim 1, wherein said movable conductive connector includes:

a conductive plate disposed on said base unit; and a swing sheet movably connected to said conductive plate, provided for said movable contact to be disposed thereon, and pushed by said pushing block when said electromagnetic unit is energized.

6. The electromagnetic relay as claimed in claim 1, wherein said movable conductive connector has:

a fixed portion positioned on said base unit;

a swinging portion extending in a first direction, disposed between said first conductive terminal and said second conductive terminal in a second direction that is transverse to the first direction, and provided for said movable contact to be disposed thereon; and a resilient tab portion disposed between said fixed portion and said movable contact in the second direction, extending from said swinging portion inclinedly toward said magnetic driven subunit and said movable contact, and configured to store a restoring force when being pushed by said pushing block, and the restoring force is for biasing said movable contact to contact said another one of said first contact and said second contact when said electromagnetic unit is powered off.

* * * * *